United States Patent
Handick

(10) Patent No.: US 9,938,059 B1
(45) Date of Patent: Apr. 10, 2018

(54) BOTTLED BEVERAGE ILLUMINATION DEVICE

(71) Applicant: John R. Handick, Buckeye, AZ (US)

(72) Inventor: John R. Handick, Buckeye, AZ (US)

( * ) Notice: Subject to any disclaimer, the term of this patent is extended or adjusted under 35 U.S.C. 154(b) by 0 days.

(21) Appl. No.: 15/693,692

(22) Filed: Sep. 1, 2017

(51) Int. Cl.
| | |
|---|---|
| *F21V 33/00* | (2006.01) |
| *B65D 51/24* | (2006.01) |
| *B65D 39/00* | (2006.01) |
| *B65D 41/04* | (2006.01) |
| *F21V 8/00* | (2006.01) |
| *F21V 23/04* | (2006.01) |
| *F21V 31/00* | (2006.01) |
| *F21V 23/02* | (2006.01) |
| *F21Y 115/10* | (2016.01) |

(52) U.S. Cl.
CPC ....... *B65D 51/248* (2013.01); *B65D 39/0058* (2013.01); *B65D 41/04* (2013.01); *F21V 23/023* (2013.01); *F21V 23/04* (2013.01); *F21V 31/005* (2013.01); *G02B 6/001* (2013.01); *F21Y 2115/10* (2016.08)

(58) Field of Classification Search
CPC .................................................. B65D 39/0058
See application file for complete search history.

(56) References Cited

U.S. PATENT DOCUMENTS

| | | |
|---|---|---|
| 6,857,755 B1 | 2/2005 | Lewis |
| 6,902,304 B2 | 6/2005 | Yang |
| 7,318,656 B1 * | 1/2008 | Merine ................ B65D 45/327 362/154 |
| 8,087,809 B2 | 1/2012 | Tikhman et al. |
| 9,090,381 B2 * | 7/2015 | Yang ........................ G09F 13/18 |
| 2004/0223332 A1 * | 11/2004 | Yang .................. B65D 39/0094 362/362 |
| 2008/0035515 A1 | 2/2008 | Dikopf |
| 2008/0272147 A1 | 11/2008 | Buker et al. |
| 2010/0213212 A1 | 8/2010 | Custodis et al. |
| 2015/0211729 A1 * | 7/2015 | Mahlmeister ...... A47G 19/2227 315/76 |

OTHER PUBLICATIONS

An LED Wand Turns Your Wine Bottles Into Lamps Without Flame. Article [online]. © 2017 Gizmodo Media Group. [Retrieved on May 5, 2017]/ <URL:https://gizmodo.com/a-conservation-photographer-gave-us-a-glimpse-into-a-su-1821265855>.

Cork Shaped Rechargeable USB LED Night Light Empty Bottle Suck Lamp mini light Power bank Lamp Wine Bottle Light for party Holiday. Product listing [online]. © 2004-2018 DHgate.com. [Retrieved on May 5, 2017]/ <URL:https://m.dhgate.com/product/cork-shaped-rechargeable-usb-led-night-light/241472566.html>.

* cited by examiner

*Primary Examiner* — Evan Dzierzynski

(74) *Attorney, Agent, or Firm* — Aaron R. Cramer; Cramer Patent & Design, PLLC.

(57) ABSTRACT

A bottled beverage illumination device includes an elongated transparent or translucent rod partially secured at a first end within a cork assembly. Above the cork assembly is housing that retains an illumination means in electrical communication with a power source and switch. At least one (1) embodiment of the device includes a cap with a fastener located on the cork assembly for removable attachment to a beverage container.

23 Claims, 10 Drawing Sheets

BOTTLED BEVERAGE ILLUMINATION DEVICE

RELATED APPLICATIONS

Not applicable.

FIELD OF THE INVENTION

The present invention relates generally to a novelty illuminating device capable of being removably placed within a beverage container opening.

BACKGROUND OF THE INVENTION

There are a wide variety of containers used to hold various beverages. These containers range from elegant wine bottles to hold the finest wines to simple plastic water bottles. The contained beverage within can range from water to beer to soda and the like as well. These beverages are often drunk in outdoor situations such as parties, food festivals, block parties, concerts, and the like.

Unfortunately, such outdoor locations provided only a minimum of ambient lighting, especially during dusk or nighttime hours. Such lighting conditions often make it difficult to see how much beverage remains in each bottle. It is also difficult to remember which bottle belongs to who, especially on a crowded outdoor table or bar. Finally, ornamental lighting is often a centerpiece of nighttime decorations with manufacturers, owners, architects, and others on the constant lookout for the latest and greatest lighting solutions that is not only functional, but aesthetically pleasing as well.

Accordingly, there exists a need for a means by which various beverage containers can be illuminated to address the lack of ambient lighting in and around the container. The development of the bottle illumination device fulfills this need.

SUMMARY OF THE INVENTION

The inventor has recognized the aforementioned, inherent problems and lack in the art and observed that there is a need for a device that produces an illuminating effect that is capable of being removably attached to a bottled beverage container, which will be described in greater detail herein, fulfills this need.

An object of the present invention is to provide such an illumination means to be able to be easily manipulated and placed on any type of bottled beverage container, be that a conventional water bottle with a threaded opening, or a wine bottle or liquor bottle that is typically stoppered with a cork or similar element. Such a device incorporates an illuminating element housed within an enclosure unit, the illuminating element in environmental communication with a light transmission rod. The enclosure typically includes an upper enclosure and lower enclosure. A cover is removably attached to an open top of the upper enclosure. A cork assembly extends away from the lower enclosure opposite the upper enclosure. The light transmission rod is routed at least partially within the cork assembly and has a first end in environmental communication with the illuminating element, which typically resides within the lower enclosure. The second end of the light transmission rod is external from the cork assembly. A power source is housed within the upper enclosure and is in electrical communication with the illuminating element.

Another object of the present invention is to provide the outer diameters of both the upper enclosure and cover to be coextensive. The outer diameter of the lower enclosure is smaller than that of the upper enclosure and cover. The outer diameter of the cork assembly is larger than the outer diameter of the lower enclosure, but smaller than that of the upper enclosure and cover. This is to ensure that the cork assembly engages the inside of a beverage container open top and provide a liquid-tight seal thereto.

Yet another object of the present invention is to provide an inverted flange bushing located at the junction of the passage of the light transmission rod through the cork assembly. In certain embodiments, the inverted flange bushing can incorporate a potting compound or other type of sealant to provide a liquid-tight seal.

Yet another object of the present invention is to provide such an illumination means to be either an ultra-bright LED or at least one (1) micro mini strand of LED's.

Still yet another object of the present invention is to provide such a light transmission rod to be translucent or transparent. The terminal second end of the light transmission rod can be tapered or chamfered.

Still yet another object of the present invention is to provide a separate embodiment that includes a cap located about the circumference of the cork assembly, adjacent the terminal end where the light transmission rod is. Such a cap can be removably attached to the cork assembly, where the cap has an aperture that permits the placement of the cap on the cork assembly. A potting compound or other sealant can be used to ensure a liquid-tight seal. Other embodiments provide for the cap and cork assembly to be manufactured out of a single unitary construction.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

Figure 1:
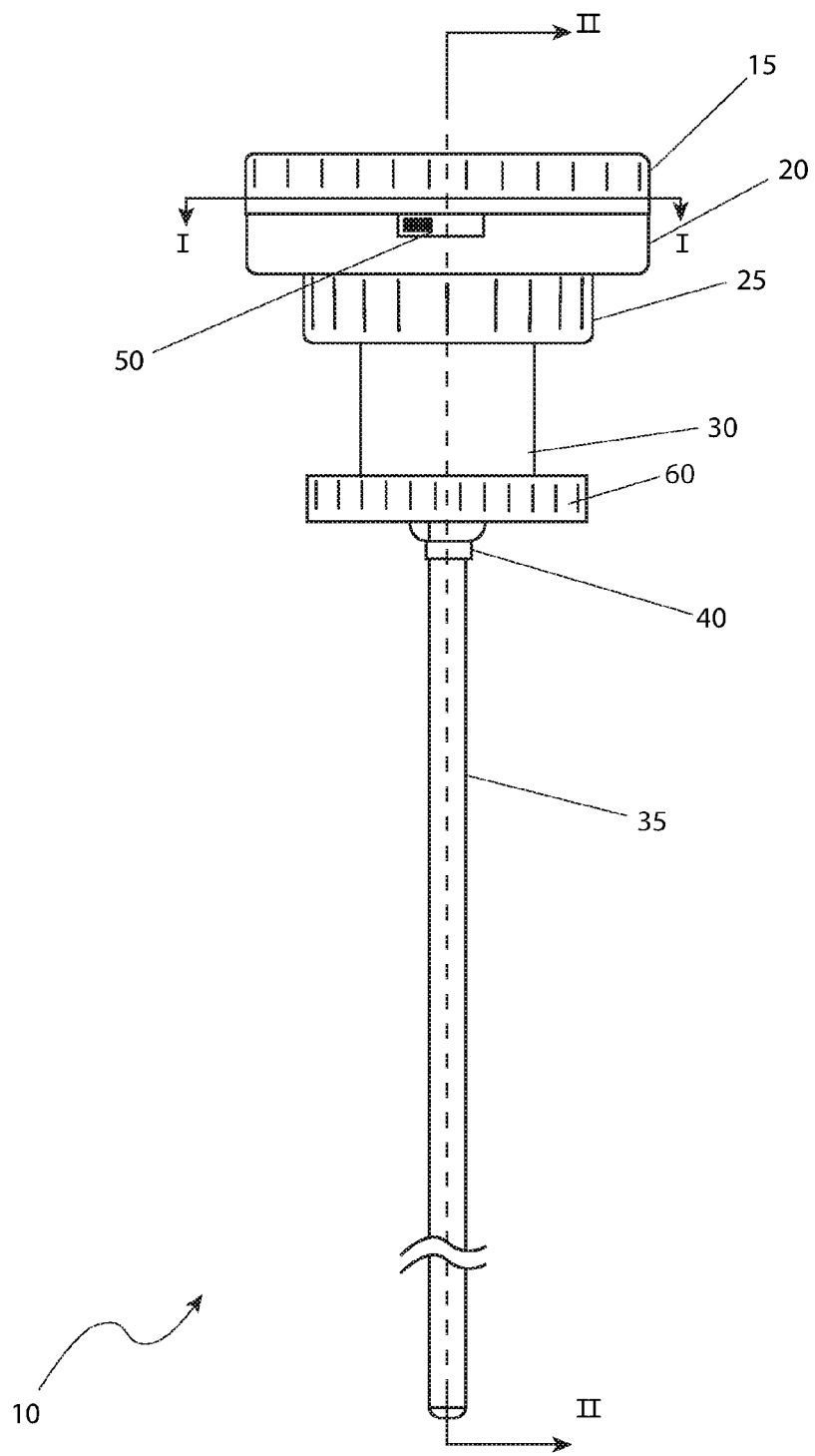
FIG. 1 is a front view of a first bottle illumination device 10, according to a preferred embodiment of the present invention.

DESCRIPTIVE KEY 10 first bottle illumination device
11 second bottle illumination device
15 upper enclosure cap
20 upper enclosure
25 lower enclosure
30 cork assembly
35 light transmission rod
40 inverted flange bushing
45 spring
50 power switch
55 battery
60 cap
65 battery contact assembly
70 fastener
75 internal wiring
80 illuminating lamp assembly
85 light rays
90 beverage container
95 alternate beverage container
100 snack dip tray
105 dip container

DETAILED DESCRIPTION OF THE PREFERRED EMBODIMENT

Figure 2:
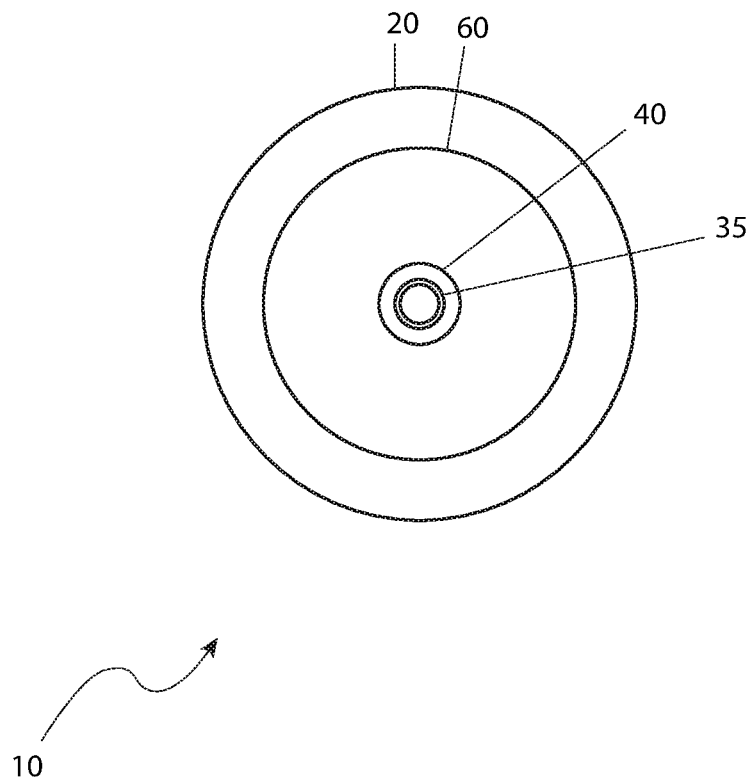
FIG. 2 is an end view of the first bottle illumination device 10, according to a preferred embodiment of the present invention.
Figure 3:
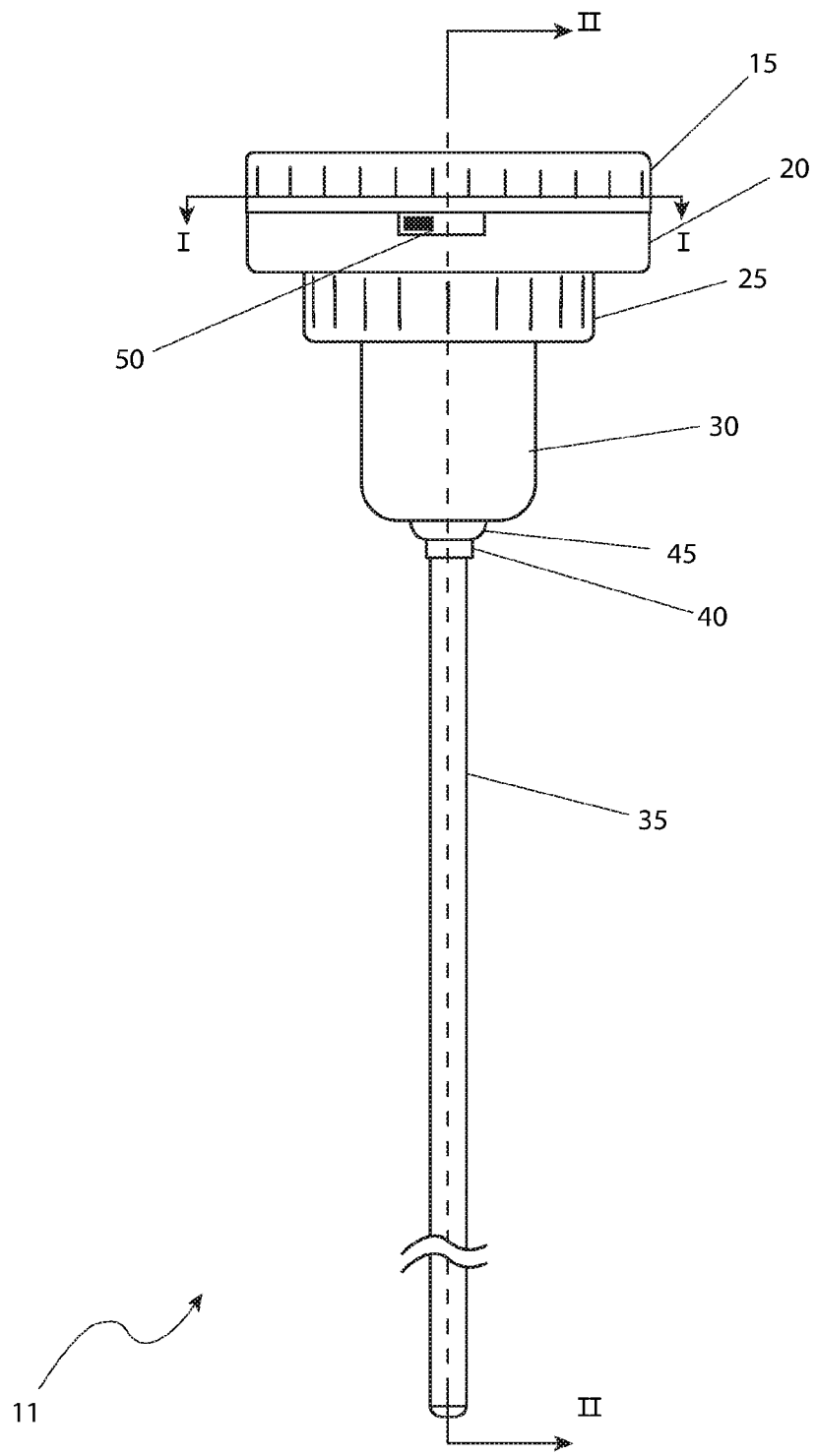
FIG. 3 is a front view of a second bottle illumination device 11, according to an alternate embodiment of the present invention.
Figure 4:
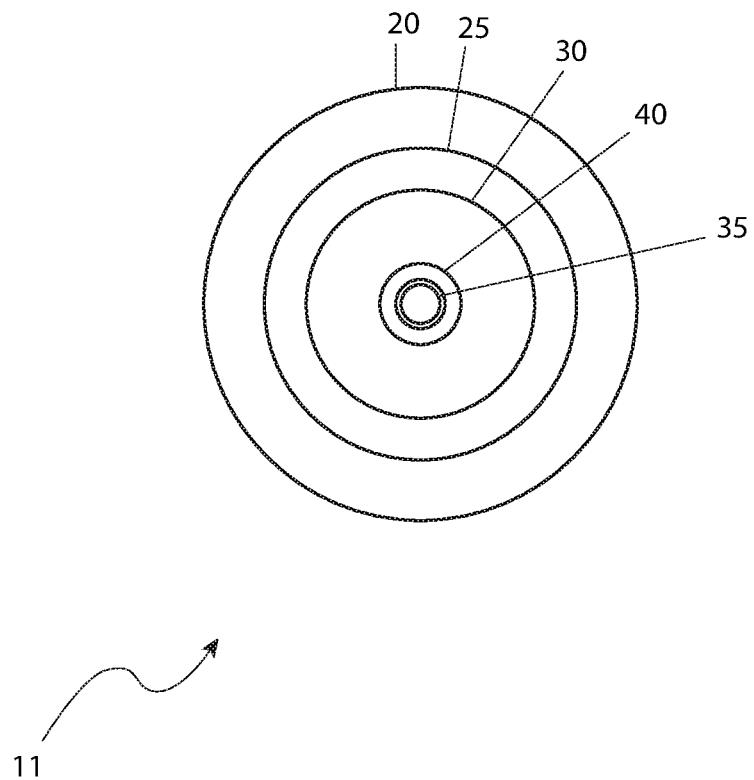
FIG. 4 is an end view of the second bottle illumination device 11, according to an alternate embodiment of the present invention.
Figure 5:
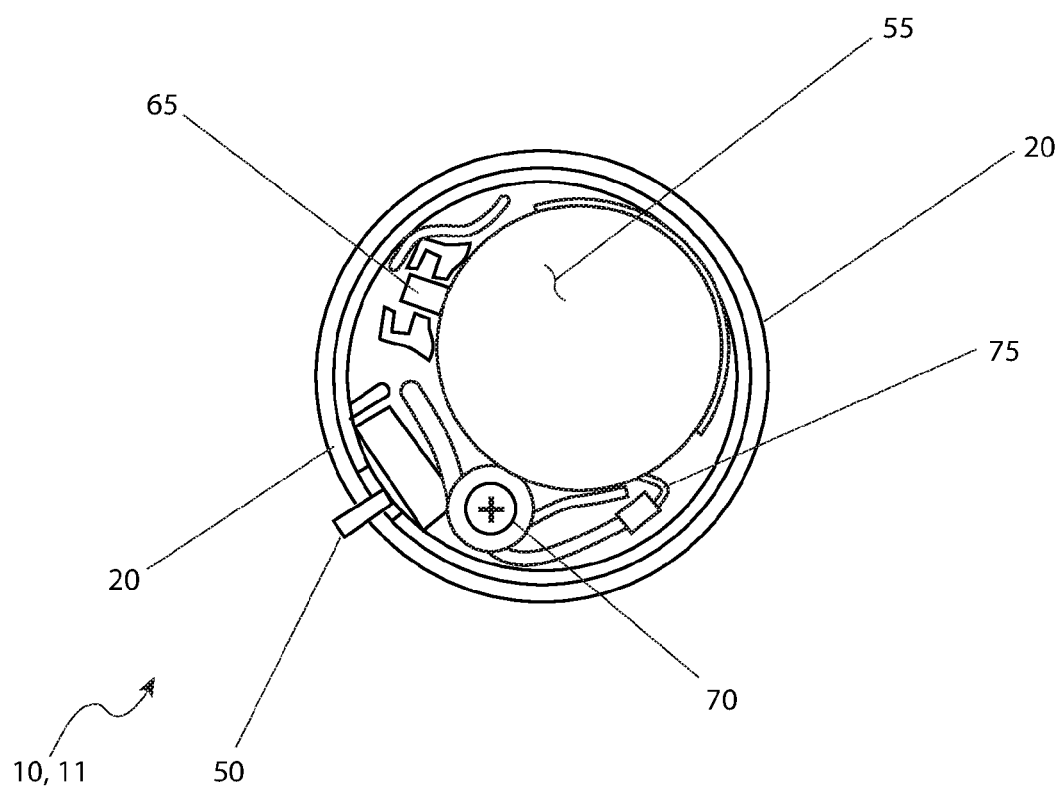
FIG. 5 is a sectional view of either device 10, 11, as seen along a line I-I, as shown either in FIG. 2 or FIG. 4.
Figure 6:
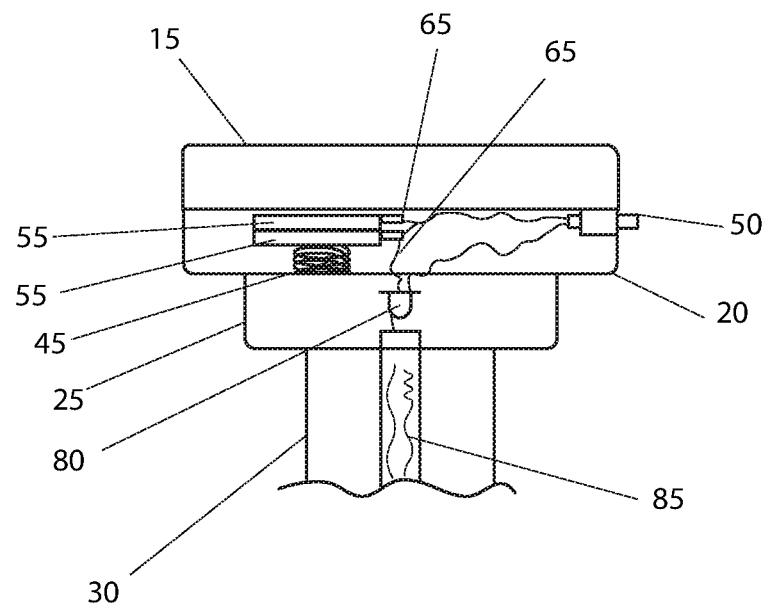
FIG. 6 is a sectional view of either device 10, 11, as seen along a line as shown either in FIG. 2 or FIG. 4.

The best mode for carrying out the invention is presented in terms of its preferred embodiment 10, herein depicted within FIGS. 1-3, and in an alternate embodiment 11 depicted in FIGS. 4-6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Referring now to FIG. 1, a front view of a first bottle illumination device 10, according to the preferred embodiment of the present invention is disclosed. The first bottle illumination device 10 (herein also described as the "first device") 10, includes an upper enclosure cap 15 and an upper enclosure 20, an illuminating lamp assembly 80, and a power source 55 as will be described in greater detail herein below. A lower enclosure 25 and a light transmission rod 35 delivers the generated light source into the environment.

Both the upper enclosure cap 15 and the upper enclosure 20 are circular in cross-section immediately below the upper enclosure 20 is a lower enclosure 25, also circular in cross-section. The lower enclosure 25 has a smaller diameter than the upper enclosure 20 and is centrally attached thereto. The upper enclosure 20 and lower enclosure 25 are preferably of a unitary construction.

Attached to and extending away from a center of the lower enclosure 25 is a cork assembly 30, envisioned to be made of natural or man-made materials, and also circular in cross-section. The cork assembly 30 has a slightly smaller diameter than that of the lower enclosure 25 and has a shape enabling fit within and providing a liquid-tight seal to conventional alternate beverage containers 95. The cork assembly 30 has a first end that is attached to or affixed to the lower enclosure 25 opposite the upper enclosure 20. It is preferred that the cork assembly 20 and lower enclosure 25 form a combined construction similar to conventional liquor bottle or wine stoppers.

A light transmission rod 35 has a first end in environmental communication with the illuminating lamp assembly 80 and preferably perpendicularly extends through the cork assembly 30 and terminates at a second end that is external from the cork assembly 35. The light transmission rod 35 is approximately three-sixteenths of an inch (3/16 in.) in diameter. Its overall length would vary per individual application but is envisioned to be typically approximately one to five inches (1-5 in.) long. The light transmission rod 35 would be made of a clear plastic solid material that passes light along its length and distributes it outward and is perhaps slightly translucent depending on the application. Possible materials of construction include but are not limited to: acrylic, Lucite™, Lexan™, Plexiglas™, or the like. The terminal second end of the light transmission rod 35 is tapered or chamfered to provide a more intense focus concentration of illumination. The specific material of construction is not intended to be a limiting factor of the present invention.

As the light transmission rod 35 passes through the cork assembly 30, an inverted flange bushing 40 maintains the position of the light transmission rod 35 and aids in its attachment thereto. A sealant is utilized at this point to maintain a water-tight seal between the internal components of the upper and lower enclosure 20, 25 and the environment. A power switch 50 is provided along the exterior surface of the upper enclosure 20 in an easily accessible position.

A cap 60 is located close to the terminal end of the cork assembly 30 and circumscribes said cork assembly 30. The cap 60 would be provided with interior threads that are universal in nature and designed to fit a wide variety of beverage containers 90 comprising commercially available plastic bottles of all sizes. The cap 60 has an aperture (not shown) centrally located so that the cork assembly 30 and light transmission rod 35 can pass through. In certain embodiments, the cap 60 is affixed to the cork assembly 30 with a potting compound or other water-tight seal. Such an aperture can be three-quarters of an inch (3/4 in.) in diameter. In other embodiments, the cap 60 is not bonded to the cork assembly 20 and can be more easily removed. In these embodiments, the cap 60 can be removed as needed. In yet other embodiments, the cap 60 and cork assembly 30 are formed together as a unitary piece of construction.

The outer side surfaces of the upper enclosure cap, the lower enclosure, and the cap portion can be knurled in certain embodiments to aid in gripping and removal of the device 10, 11 from the container 90, 95.

FIGS. 3 and 4 illustrate the second device 11. The second device 11 is generally identical to the first device 10, except for the lack of a cap 60 on the cork assembly 30. The second device 11 is intended to be utilized in conditions where a cork stopper is commonly used on an alternate beverage container 95, such as a wine bottle or a liquor bottle.

Referring next to FIG. 5, a sectional view of the first device 10, as seen along a line I-I, as shown in FIG. 1, and a sectional view of the second device 11, as seen along a line I-I, as shown in FIG. 3, is described. The upper enclosure 20 provides a circular housing as indicated. The overall diameter is envisioned to be approximately one and a half inches (1½ in.). One (1) of two (2) batteries 55 are visible and are in electrical communication with a battery contact assembly 65. The remaining battery 55 is located underneath the first battery 55 and is not visible in this figure due to illustrative limitations. The power switch 50 is held in place via a fastener 70 such as a screw. Internal wiring 75 (partially visible) connect the various electronic components (both shown and hidden) together, and will be described in greater detail herein below. It is envisioned that the batteries 55 will be of the CR2032 3-volt lithium style due to their disk-shaped nature and the circular shape of the upper enclosure 20; however, other styles, voltages, and chemical structures can be utilized with equal effectiveness, and as such, the use of any specific style of batteries 55 should not be interpreted as a limiting factor of the present invention. It is envisioned that the batteries 55 would be capable of powering the either the first device 10 or second device 11 for periods of up to five to six hours (5-6 h) or possibly longer.

Referring now to FIG. 6, a sectional view of the first device 10, as seen along a line II-II, as shown in FIG. 1, and a sectional view of the second device 11, as seen along a line II-II, as shown in FIG. 4, is described. The upper enclosure 20 portrays the power switch 50 on its exterior for easy access by the user. The upper enclosure cap 15 provides securement for the interior components of the first and second device 10, 11, along with providing environmental protection such as waterproofing. The upper enclosure cap 15 is removed for periodic replacement of depleted batteries 55. The two (2) batteries 55 are stacked together on top of a spring 45, oriented in the correct polarity. The spring 45 biases the batteries 55 upward against the upper enclosure cap 15 to ensure that the batteries 55 contact the battery contact assembly 65 when the upper enclosure cap 15 is fastened to the upper enclosure 20, and to ensure that the batteries 55 are disconnected from the battery contact assembly 65 when the upper enclosure cap 15 is removed, also to avail a user in removing one (1) or both of the batteries 55.

The internal wiring 75 then interconnects the battery contact assembly 65 and the power switch 50 to an illuminating lamp assembly 80 located within the confines of either the upper enclosure 20 or the lower enclosure 25. The illuminating lamp assembly 80 is envisioned to be a five millimeter (5 mm) ultra-bright LED utilizing various colors. Other options such as color changing, flashing, fading, and the like could be utilized as well. The light output from the illuminating lamp assembly 80 then shines down the light transmission rod 35 via a series of light rays 85. An alternate embodiment of the illuminating lamp assembly 80 could utilize at least one (1) three to four inch (3-4 in.) strand of micro mini LED's that are placed with a hollow version of the light transmission rod 35 and thus extend down the entire length of the light transmission rod 35. Thus, either device 10, 11 provides for light emission from the exterior of the light transmission rod 35 which can be accomplished by these methods and many others realized by those skilled in the art. The specific method of the light emission is not intended to be a limiting factor of the present invention.

Figure 7:
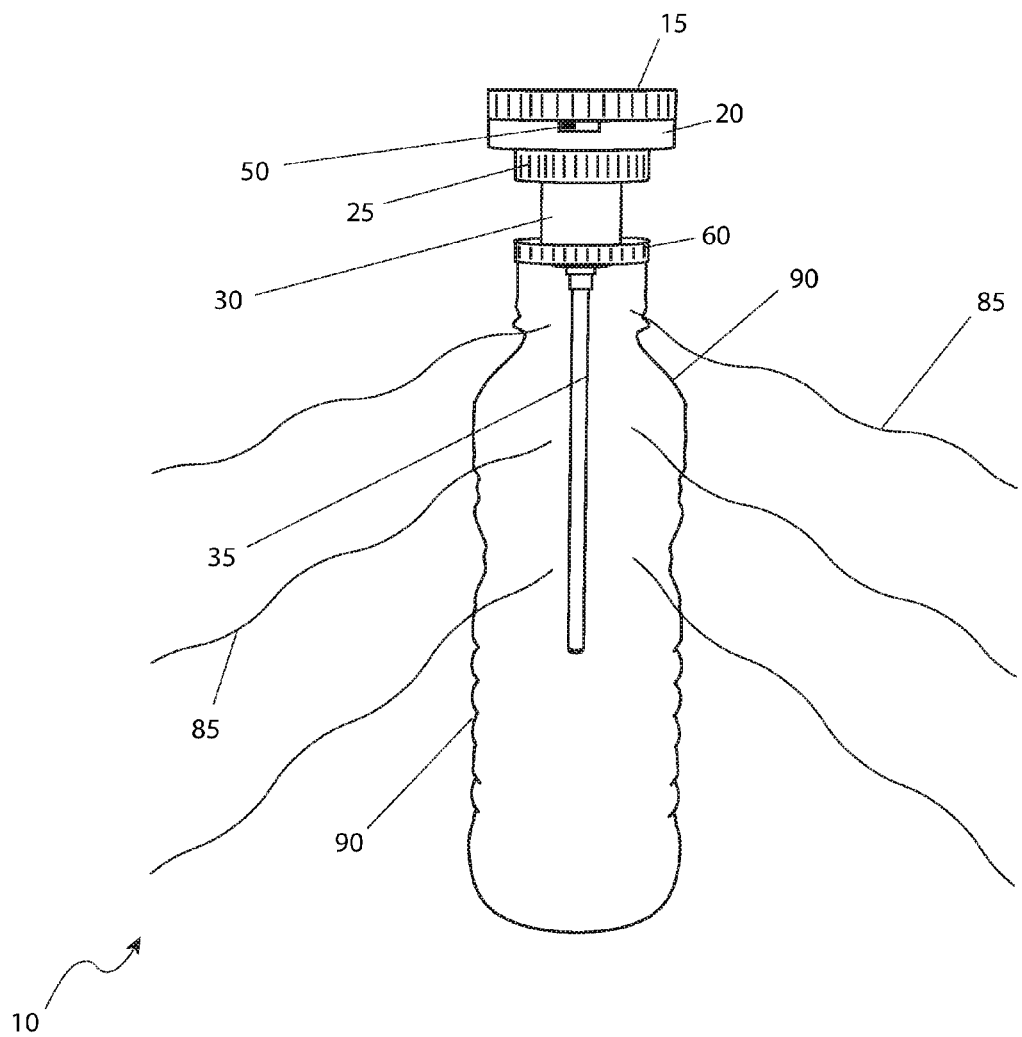
FIG. 7 is a perspective view of the first bottle illumination device 10, shown in a utilized state in a beverage container 90, according to the preferred embodiment of the present invention.

Referring next to FIG. 7, a perspective view of the first device 10, shown in a utilized state in a beverage container 90, according to the preferred embodiment of the present invention is disclosed. The beverage container 90 is portrayed as a water bottle, although other types of beverage container 90 such as soda bottles, tea bottles, fruit juice bottles, and the like with similar transparent sidewalls could be utilized with equal effectiveness. The cap 60 of the first device 10 is placed onto the beverage container 90 in place of the conventional cap. The cap 60 provides a liquid-tight seal. The light transmission rod 35 can be inserted into the contained beverage container 90 without worry of contamination due to its sealed nature. When the power switch 50 is energized by the user, the first device 10 produces a low-level light, via the light rays 85, from the light transmission rod 35 which emanates through the beverage container 90, any contained liquid or beverage, as well as the immediate vicinity of the beverage container 90. As such, the first device 10 can also be used to transform a beverage container 90 into a flashlight or an illuminated bottle with or without water creating a safety light making those who walk or jog during nighttime hours more visible. This configuration has additional applications while camping or during power failures.

Figure 8:
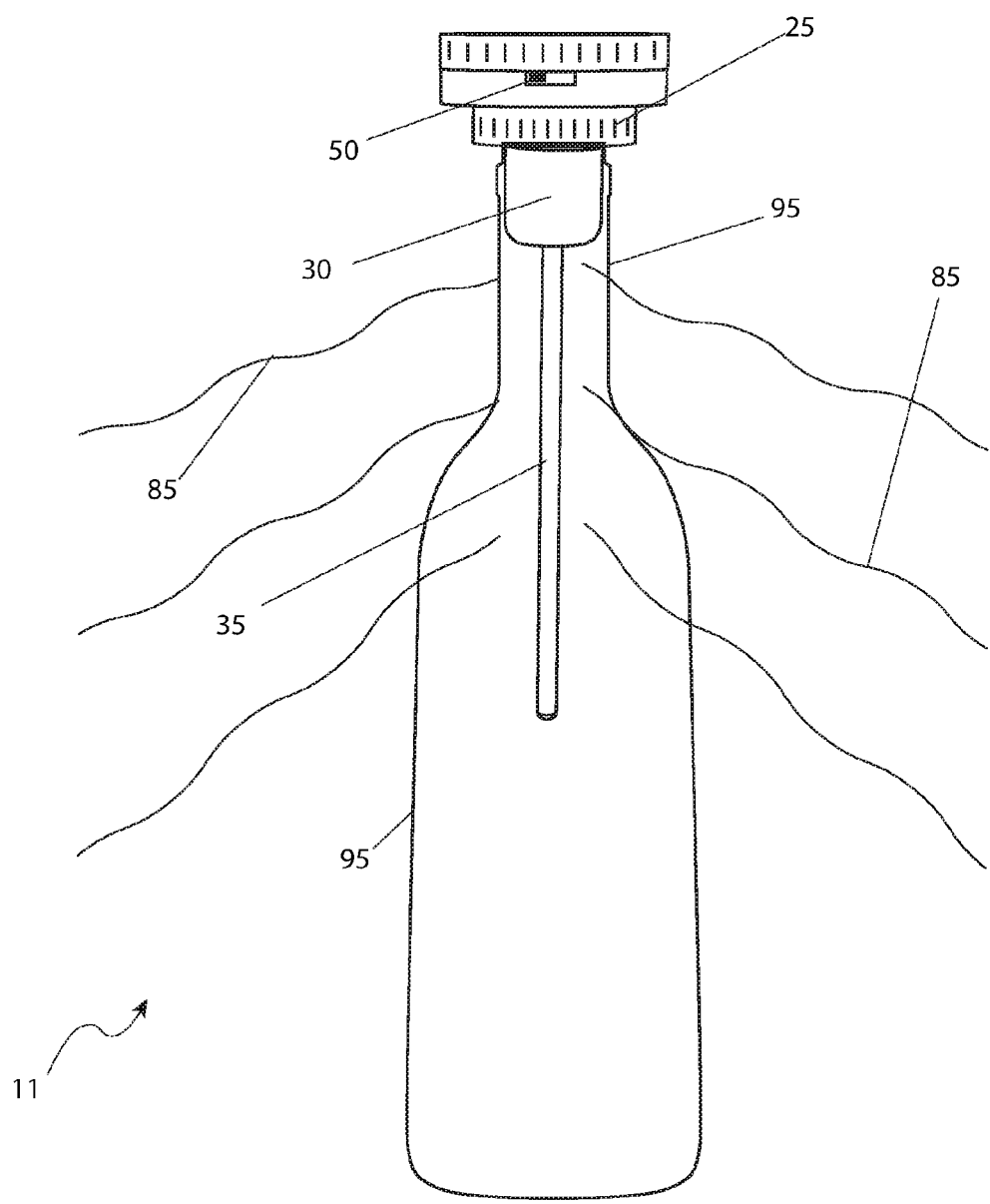
FIG. 8 is a perspective view of the second bottle illumination device 11, shown in a utilized state in an alternate beverage container 95, according to the preferred embodiment of the present invention.

Referring now to FIG. 8, a perspective view of the second device 11, shown in a utilized state in an alternate beverage container 95, according to the preferred embodiment of the present invention is depicted. The alternate beverage container 95 is portrayed as a standard wine bottle of the seven hundred fifty milliliter (750 mL) size variety, although other sized bottles could be utilized with equal effectiveness. The alternate beverage container 95 can also be used to contain other types of alcoholic beverage such as vodka, rum, whiskey, or the like. The second device 11 is placed into the alternate beverage container 95 in place of the conventional cork or cap, where the cork assembly 30 provides a liquid-tight seal.

The light transmission rod 35 can be inserted into the contained liquid contents without worry of contamination due to its sealed nature. When the power switch 50 is energized by the user, the second device 11 produces a low-level light, via the light rays 85, from the light transmission rod 35 which emanates through the alternate beverage container 95, any contained liquid or beverage, as well as the immediate vicinity of the alternate beverage container 95. This configuration provides the user the ability to see the remaining level of alcoholic beverage in the alternate beverage container 95 without the necessity of shaking it, applying an external light source, or removing it to a location with higher ambient light levels. Additionally, when removed from the alternate beverage container 95, the second device 11 can be used to illuminate the label of the alternate beverage container 95 and the immediate surrounding area. Finally, the appearance of multiple alternate beverage containers 95, each with its own second device 11, perhaps of differing colors, presents an aesthetically pleasing environment such as on a dining table, behind a bar, or the like.

Figure 9:
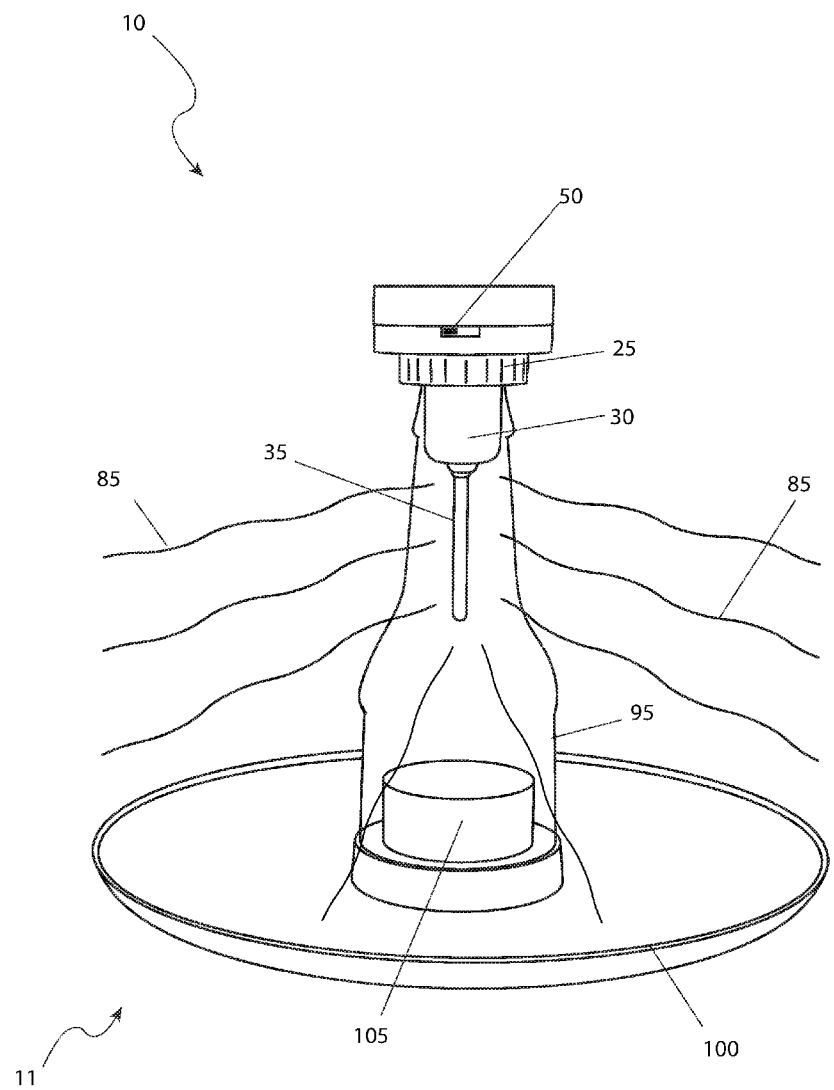
FIG. 9 is a perspective view of the second bottle illumination device 11, shown in a utilized state in a snack dip tray 100, according to the preferred embodiment of the present invention; and, FIG. 10 is an electrical schematic diagram of the major electrical components as used in either the first or second bottle illumination device 10, 11, according to a preferred embodiment of the present invention.

Referring next to FIG. 9, a perspective view of the second device 11, shown in a utilized state in a snack dip tray 100, according to the preferred embodiment of the present invention is shown. The snack dip tray 100 is portrayed as a typical serving tray used for hors d'oeuvres or snacks. It may or may not be provided with a central dip container 105 used to contain sauces, dips, salsa, or the like. An alternate beverage container 95, which has its bottom portion removed is placed in the center of the snack dip tray 100 over the dip container 105 (if provided). When the power switch 50 is energized by the user, the second device 11 produces a low-level light, via the light rays 85, from the light transmission rod 35 which emanates through the alternate beverage container 95, and illuminates the dip container 105 (if provided) as well as the snack dip tray 100 and any contents. As such, the alternate beverage container 95 serves not only as an illumination source, but also as a shield for the dip container 105 against contaminants such as bugs, dust, dirt, and the like.

Figure 10:
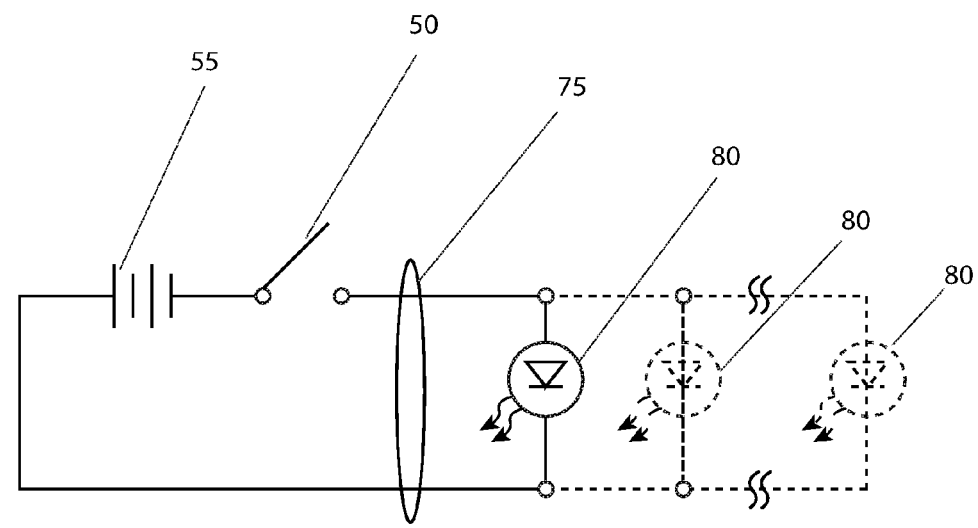
Figure 10:
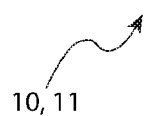

Referring finally to FIG. 10, an electrical schematic diagram of the major electrical components as used in the first device 10 and second device 11, is disclosed. Electrical power for the device 10, 11 is provided by the two (2) batteries 55 wired in series. Power is controlled by the power switch 50 and routed over internal wiring 75 to at least one (1) illuminating lamp assembly 80. Additional illuminating lamp assemblies 80, if needed, are wired in parallel as shown. Additional illuminating lamp assemblies 80 may be utilized with the hollow light transmission rod 35 (as shown in FIG. 1) if needed for a beverage container 90 (as shown in FIG. 4) or with the hollow light transmission rod 35 (as shown in FIG. 4) if needed for an alternate beverage container 95 (as shown in FIG. 5 or FIG. 6) that utilizes darker color materials or is more opaque in nature. Additional illuminating lamp assemblies 80 will provide a corresponding increase in light level output.

The preferred embodiment of the present invention can be utilized by the common user in a simple and effortless manner with little or no training. It is envisioned that the first device 10 would be constructed in general accordance with FIG. 1-FIG. 3 and FIG. 7 and the second device 11 would be constructed in general accordance with FIG. 4-FIG. 7. The user would procure the device 10, 11 with the necessary size and dimension requirements needed with regards to the bottle cap 25, the cork assembly 30 and the light transmission rod 35.

After procurement and prior to utilization, either device 10, 11 would be prepared in the following manner: remove the upper enclosure cap 15, insert two (2) batteries 55 into the upper enclosure 20 on the spring 45 to contact the battery contact assembly 65, and replace the upper enclosure cap 15.

During utilization of the first device 10, the following procedure would be initiated: select a desired beverage container 90, remove the factory applied cap, fasten the cap 60 of the first device 10 onto the beverage container 90 such that the light transmission rod 35 is inserted into the beverage container 90, seal the beverage container 90, turn the power switch 50 on, and utilize the beverage container 90 as a light source for illumination and/or aesthetic purposes.

During utilization of the second device 11, the following procedure would be initiated: select an alternate beverage container 95, remove the factory applied cork, insert the cork assembly 30 and light transmission rod 35 of the second device 10 into the alternate beverage container 95, seal the alcoholic beverage container 95, turn the power switch 50 on, and utilize the alternate beverage container 95 as a light source for illumination and/or aesthetic purposes.

In the case of the snack dip tray 100, the alternate beverage container 95 (with lower portion cut off and removed) is utilized in the same manner as the alternate beverage container 95 holding liquid.

After use of either device 10, 11, it is removed from the respective container 90, 95, the power switch 50 turned off, cleaned, and stored for subsequent use in a cyclical manner, with the batteries 55 replaced on an as-needed basis.

The first device 10 can also be installed directly on the beverage container 90 during manufacture or filling thereof. Similarly, the second device 11 can also be installed directly on the alternate beverage container 95 during manufacture or filling thereof.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An illumination device, comprising:
   an upper enclosure, comprising an open top, a sidewall, and an interior;
   a cover removably attached to a perimeter top of said upper enclosure;
   a lower enclosure extending away from a bottom of said upper enclosure, opposite said open top;
   a cork assembly, having a first end attached to a bottom of said lower enclosure opposite said upper enclosure;
   a power source housed within said upper enclosure;
   an illuminating element housed within said lower enclosure and in electrical communication with said power source; and,
   a light transmission rod, having a first end in environmental communication with said illuminating element, a portion thereof attached within said cork assembly, said light transmission rod extending outward from a cork assembly second end of said opposite said cork assembly first end to terminate at a second end;
   wherein said cork assembly is configured to engage within open top of a beverage container and provide a liquid-tight seal thereto;
   wherein said light transmission rod extends within said beverage container when said cork assembly engages said beverage container open top; and,
   wherein light generated by said illuminating element is directed within said light transmission rod.

2. The illumination device of claim 1, wherein:
   said upper enclosure and said cover has a coextensive first outer diameter;
   said lower enclosure has a second outer diameter smaller than said first outer diameter; and,
   said cork assembly has a third outer diameter larger than said second outer diameter and smaller than said first outer diameter.

3. The illumination device of claim 1, further comprising an inverted flange bushing located at said cork assembly second end and circumscribing a portion of said light transmission rod.

4. The illumination device of claim 3, further comprising a sealant bonding said inverted flange bushing, said cork assembly second end, and said light transmission rod portion.

5. The illumination device of claim 1, further comprising a power switch located on said upper enclosure sidewall in electrical communication between said power source and said illuminating element.

6. The illumination device of claim 5, wherein said power source further comprises a battery contact assembly in electrical communication between at least one battery and said power switch.

7. The illumination device of claim 6, further comprising a spring located on an inner surface of said upper enclosure interior that biases each battery towards said open top;
wherein when said cover is attached to said upper enclosure, said spring enables each battery to contact said battery contact assembly.

8. The illumination device of claim 1, wherein said illuminating element is an ultra-bright LED.

9. The illumination device of claim 1, wherein said illuminating element is at least one micro mini LED strand extending within said light transmission rod.

10. The illuminating device of claim 1, wherein said light transmission rod has a transparent or translucent material of construction, and wherein said light transmission rod second end is tapered or chamfered.

11. An illumination device, comprising:
an upper enclosure, comprising an open top, a sidewall, and an interior;
a cover removably attached to a perimeter top of said upper enclosure;
a lower enclosure extending away from a bottom of said upper enclosure, opposite said open top;
a cork assembly, having a first end attached to a bottom of said lower enclosure opposite said upper enclosure;
a cap disposed about a circumference of said cork assembly adjacent a second end thereof;
a power source housed within said upper enclosure;
an illuminating element housed within said lower enclosure and in electrical communication with said power source; and,
a light transmission rod, having a first end in environmental communication with said illuminating element, a portion thereof attached within said cork assembly subjacent said cap, said light transmission rod extending outward from a cork assembly second end of said opposite said cork assembly first end to terminate at a second end;
wherein said cork assembly is configured to engage within an open top of a beverage container and provide a first liquid-tight seal thereto;
wherein said cap is configured to removably attach to an open top of a beverage container and provide a second liquid-tight seal thereto;
wherein said light transmission rod extends within said beverage container when said cork assembly engages said beverage container open top; and,
wherein light generated by said illuminating element is directed within said light transmission rod.

12. The illumination device of claim 11, wherein:
said upper enclosure and said cover has a coextensive first outer diameter;
said lower enclosure has a second outer diameter smaller than said first outer diameter;
said cork assembly has a third outer diameter larger than said second outer diameter and smaller than said first outer diameter;
said cap has a fourth outer diameter larger than said third outer diameter.

13. The illumination device of claim 11, wherein said cap and said cork assembly are a unitary construction.

14. The illumination device of claim 11, wherein said cap has an interior aperture that is removably attached to said cork assembly.

15. The illumination device of claim 14, further comprising a sealant bonding said cap to said cork assembly.

16. The illumination device of claim 11, further comprising an inverted flange bushing located at said cork assembly second end and circumscribing a portion of said light transmission rod.

17. The illumination device of claim 16, further comprising a sealant bonding said inverted flange bushing, said cork assembly second end, and said light transmission rod portion.

18. The illumination device of claim 11, further comprising a power switch located on said upper enclosure sidewall in electrical communication between said power source and said illuminating element.

19. The illumination device of claim 18, wherein said power source further comprises a battery contact assembly in electrical communication between at least one battery and said power switch.

20. The illumination device of claim 19, further comprising a spring located on an inner surface of said upper enclosure interior that biases each battery towards said open top;
wherein when said cover is attached to said upper enclosure, said spring enables each battery to contact said battery contact assembly.

21. The illumination device of claim 11, wherein said illuminating element is an ultra-bright LED.

22. The illumination device of claim 11, wherein said illuminating element is at least one micro mini LED strand extending within said light transmission rod.

23. The illuminating device of claim 11, wherein said light transmission rod has a transparent or translucent material of construction, and wherein said light transmission rod second end is tapered or chamfered.

* * * * *